March 13, 1951 R. E. SCHULZ 2,544,966
HYDRAULICALLY OPERATED CHUCK
Filed June 20, 1946 3 Sheets-Sheet 1

INVENTOR
Richard E. Schulz
BY
Frank C. Barman
ATTORNEY

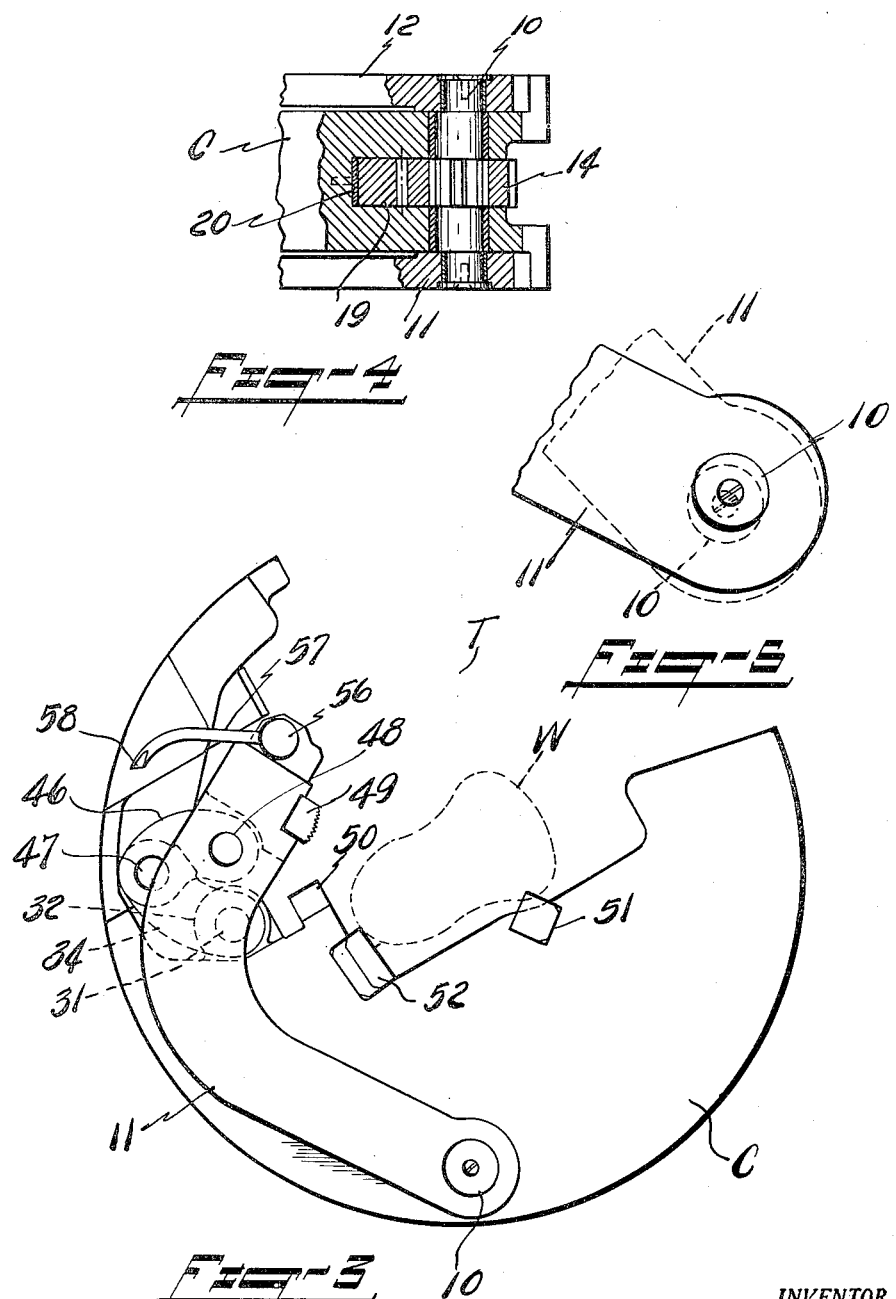

March 13, 1951 — R. E. SCHULZ — 2,544,966
HYDRAULICALLY OPERATED CHUCK
Filed June 20, 1946 — 3 Sheets-Sheet 3
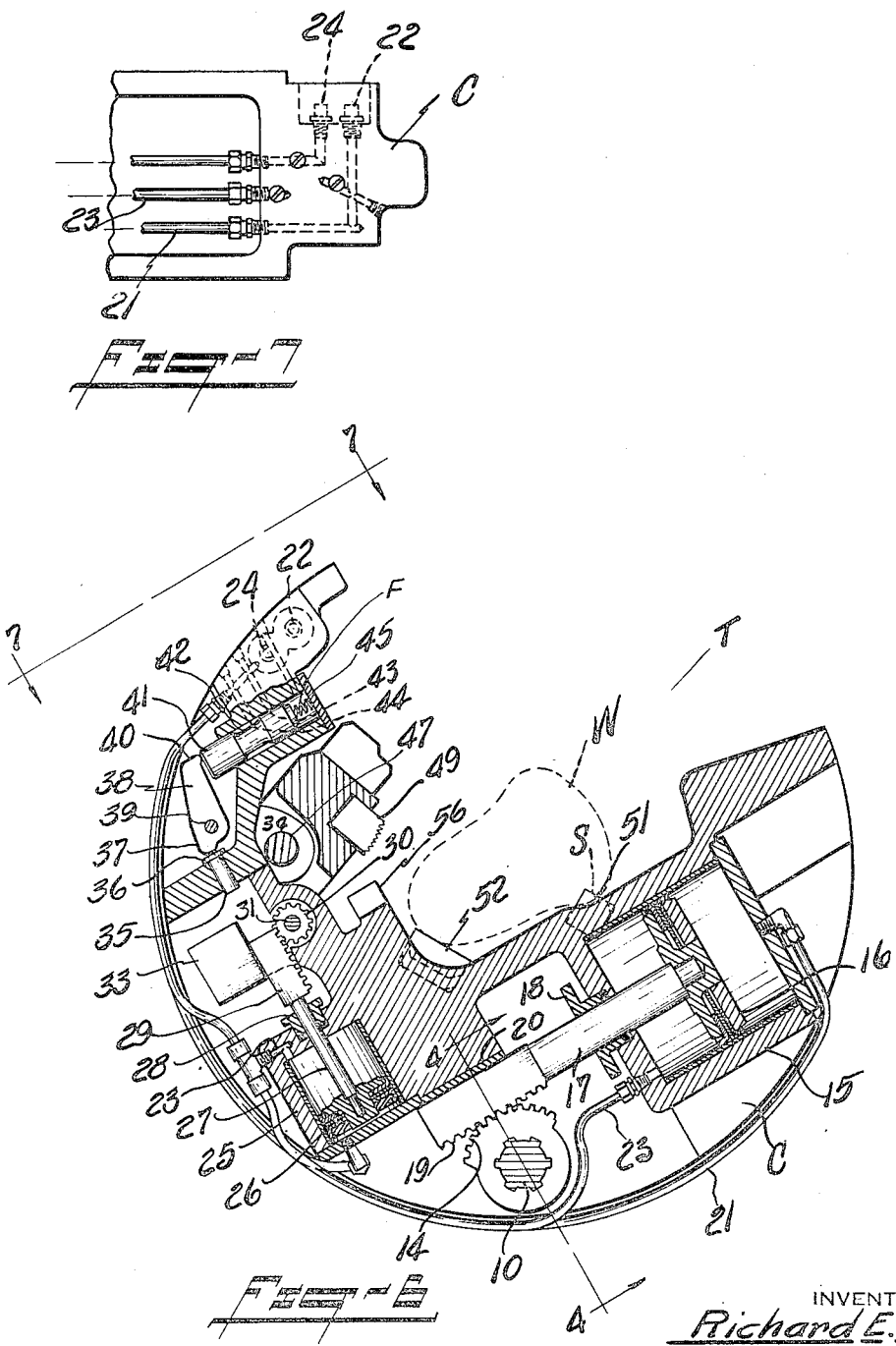
INVENTOR
Richard E. Schulz
BY
Frank C. Karman.
ATTORNEY Patented Mar. 13, 1951

2,544,966

UNITED STATES PATENT OFFICE 2,544,966

HYDRAULICALLY OPERATED CHUCK

Richard E. Schulz, Saginaw, Mich., assignor to Wickes Bros., Saginaw, Mich.

Application June 20, 1946, Serial No. 678,122

10 Claims. (Cl. 82—40)

This invention is designed for the chucking of work-pieces in lathes, and more particularly to the chucking of crankshafts in center drive crankshaft line bearing lathes for turning the main line bearings, etc., on automotive crankshafts and similar equipment, the mechanism being especially adaptable for gripping a pre-located work-piece by means of pre-machined locating surfaces on the sides of the crankshaft webs.

One of the prime objects of the invention is to design a positive clamping chuck which is very rapid in action and which can be operated with a minimum of effort by the operator.

Another object is to provide a chucking mechanism which is fully automatic in its locking and unlocking operations and which is operable in a minimum length of time.

A further feature of the invention is to provide a chucking device including locating means which may be brought to predetermined located position in the chuck to engage pre-machined locating surfaces on a work-piece which has been previously pre-located on the axis of rotation of the lathe, and provide suitable clamping devices operating in cooperation therewith for securely binding the work-piece to the work engaging members of the chuck, while holding it in the true located position on the axis of rotation of the lathe.

To the accomplishment of the foregoing and related ends, said invention then consists in the means hereinafter fully described, and particularly pointed out in the claims, the annexed drawings and following description setting forth, in detail, certain means and one mode of carrying out the invention, such disclosed means and mode illustrating, however, but one of various ways in which the principle of the invention may be used.

In the drawings:

Fig. 3 is a view similar to Fig. 1 showing the chuck in open position, the broken lines showing a crankshaft located in position therein.

Fig. 4 is a fragmentary, part-sectional edge view taken on the line 4—4 of Fig. 6 showing the rack and eccentric shaft.

Fig. 5 is an enlarged, fragmentary, detail of the lower end of the eccentric clamping arms, the broken lines illustrating the eccentric action.

Fig. 6 is a vertical, sectional view showing the chuck in open position.

Fig. 7 is an enlarged, fragmentary plan view looking in the direction indicated by line 7—7 of Fig. 6 and showing the air lines etc.

For the purpose of illustration, the invention is shown applied to chucking a crankshaft W having pre-machined surfaces forming locating areas S on its webs.

The ends of the crankshaft W are supported in the usual lathe centers (not shown), and I do not deem it necessary to show or describe the lathe as the instant invention is directed to chucking mechanism only.

Figure 2:
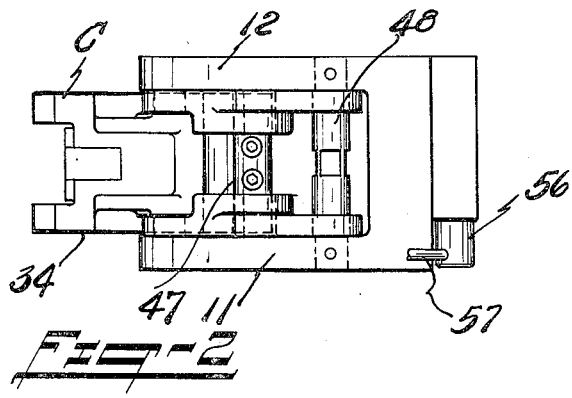
Fig. 2 is a fragmentary, plan view taken on the line 2—2 of Fig. 1.
Figure 1:
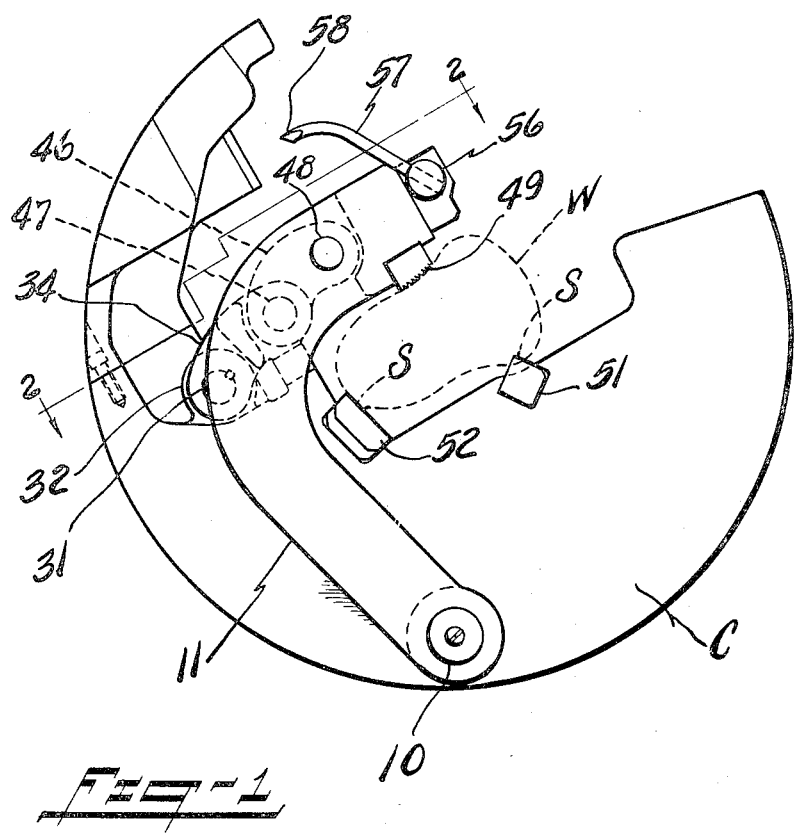
Fig. 1 is a side-elevational view of my chucking mechanism showing in broken lines a conventional crankshaft locked in position therein.

The chuck body C can be of any desired design, but is preferably disk-shaped as shown in Figs. 1, 3, and 6 of the drawings, and is formed with a throat opening T to facilitate insertion and/or removal of the work.

An eccentric shaft 10 is journaled in the chuck body C, and clamping arms 11 and 12 respectively are mounted on the ends of said shaft. A segment 14 is also mounted on the shaft 10 intermediate the clamping arms; and a main lock cylinder 15 is provided in the chuck body directly adjacent the shaft 10, a piston 16 being reciprocatingly mounted in said cylinder, and a piston rod 17 is connected thereto, a packing gland 18 being provided as shown to provide a tight, leak-proof joint.

A rack section 19 is provided on the outer end of the piston rod 17 and has toothed engagement with the segment 14 provided on the shaft 10, a wear plate 20 being provided for engagement by said rack as usual.

A pressure line 21 is connected to and opens into the upper unlock end of the cylinder 15 and leads to an intake port 22 provided on the upper edge of the chuck body, a similar pressure line 23 being connected to the lower end of the cylinder 15, said line leading to an intake port 24 located adjacent the port 22.

A relatively small, vertically disposed cylinder 25 is mounted in the chuck body C, and a piston 26 is reciprocatingly mounted therein, a piston rod 27 being connected to said piston, and a packing gland 28 forms a leak-proof joint as usual. A rack 29 is provided on the outer end section of the rod 27, said rack meshing with and driving a pinion 30 provided on the shaft 31 which is in turn journaled in bearings 32 provided in the chuck body, a bearing block 33 being provided adjacent the rack for engagement with the back face thereof.

Any desired pressure medium, either hydraulic or pneumatic, may be utilized for actuating the pistons and is, of course, connected to any suitable source of supply.

The cylinders 15 and 25 are interconnected and are actuated in predetermined sequence, the pressure line 21 opening into the upper unlock end of cylinder 15 and also into the unlock end of cylinder 25, while pressure line 23 opens into the lock end of these cylinders 15 and 25.

A toggle link 34 is also mounted on the pinion shaft 31 and is actuated thereby when the shaft is rotated. When pressure is applied to the upper end of the cylinder 25, the rack 29 is forced upwardly so that the end thereof contacts the pin 35 which is mounted in the chuck body, the head 36 of said pin engaging the offset section 37 of lever 38 which is pivotally mounted at the point 39, and inasmuch as the lever 38 is mounted off center, the upward movement of the pin will swing the lever in a clockwise direction about the pivot point 39, the free end 40 engaging the valve spool 41 which is mounted in cylinder F.

The center section of the valve 41 is reduced for a predetermined distance as at 42, so that in certain predetermined position the ports 43 and 44 that open to the cylinder F will be uncovered, thus admitting the pressure medium to the lock end of the cylinder 15, and a spring 45 is provided for forcing the spool 41 back to original position after the chuck opening operation.

A toggle link 46 is pivotally connected to the link 34 by means of the pin 47, and a pin 48 serves to connect the link 46 to the upper ends of the clamping arms 11 and 12 on which the toothed dog 49 is secured, a stop 50 being provided to limit swinging movement of the clamp arms.

It is extremely important that the mechanism rigidly grip, support, and drive the crankshaft W by engaging the respective pre-machined locating surfaces, and locating lands 51 and 52 are therefore provided on the chuck body and are secured in position in any approved manner, the pre-machined locating areas S engaging these lands, after which the chuck mechanism is actuated to firmly and rigidly clamp the work in position.

The locking operation of the chuck is as follows:

When the mechanism is in position as shown in Fig. 3 of the drawings with the work-piece W located as indicated in broken lines, the operator connects the pressure medium to port 24 which communicates with the lower end of cylinder 25, causing the piston 26 to move upwardly, this upward travel actuates pinion 31 and toggle arms 34, swinging the clamping arms 11 and 12 downwardly into position. Continued upward travel of the rack 29 brings it into engagement with pin 35 which engages the lever 38, this lever forcing the valve body 41 to position shown in Fig. 6 of the drawings and establishing communication between ports 43 and 44 and admitting the pressure medium to the lock side or upper end of the cylinder 15. Pressure on the piston 16 forces it upwardly, the rack 19 actuating segment 14 and rotating eccentric shaft 10 in an orbital movement to force arms 11 and 12 past center to positive locked position on the work-piece where it is held during the machining operation.

To unlock the chuck, the operator connects the pressure medium to the open end of cylinders 15 and 25, and when the necessary pressure is built up, the cylinder 15 moves in an upward direction, the rack 19 actuating segment 14 and rotating the eccentric shaft 10, causing the clamping arms 11 and 12 to swing upwardly, to center position; air pressure on the piston 26 then forces it downwardly, the pinion 31 rotating the shaft to retract the linkage to unlocked position shown in Fig. 3 of the drawing, after which the work is removed preparatory to placing another crankshaft in the chuck.

A tubular member 56 is revolvably journaled in the outer ends of the clamping arms 11 and 12, and a pointer 57 is mounted therein, the end being flatted as at 58. Each work-piece is suitably marked to indicate proper setting, and the pointer is adapted to be swung downwardly by the operator and serves as a gauge so that the work-piece can be properly positioned.

The above described arrangement provides a chucking mechanism which is adapted to engage and accurately support and rotate a crankshaft which has been pre-located on the axis of rotation of the lathe by means of pre-machined locating surfaces on the work-piece.

What I claim is:

1. In a chucking device, a rotary chuck body adapted to engage a work-piece, a pair of elongated clamping arms pivotally and swingingly journaled thereon, toggle arms pivotally connected to said body and to the clamping arms at a point adjacent the outer free ends thereof, a reciprocating pressure actuated means for actuating said toggle arms to swing the clamping arms into and out of engagement with the work-piece, and eccentric means operable in predetermined sequence for swinging said clamping arms off center about their pivot point to positively lock the work in the chuck.

2. The construction as set forth in claim 1 in which the pressure actuated means for actuating the toggle arms and clamping arms are synchronized and interconnected, and means connected to said clamping arm actuating means for automatically swinging the clamping arms to off center position.

3. The combination defined in claim 1 in which the clamping arms locking means comprises a pressure actuated piston, a piston rod, having a rack formed integral therewith, an eccentric shaft adjacent thereto, and a segment on the shaft and actuated by the travel of the piston rod rack for rotating said eccentric shaft.

4. In a rotary chucking device, locating lands mounted thereon and adapted to engage pre-machined locating areas on a work-piece, an eccentric shaft, a pair of clamping arms pivotally and swingingly mounted on said shaft, pressure-actuated, interconnected, reciprocating means for swinging said arms into engagement with the work-piece, and means engageable with said shaft for providing orbital movement to the clamping arms to firmly lock the work-piece in the device.

5. The combination defined in claim 4 in which toggle arms are pivotally connected to the chuck body and to the clamping arms, and pressure actuated means for actuating said eccentric shaft.

6. The combination set forth in claim 4 in which said clamping arms and toggle arm actuating means comprises a rack and gear arrangement, and pressure actuated means for actuating said eccentric shaft.

7. In a chucking mechanism for gripping and holding a work-piece having pre-machined locating surfaces thereon, a rotatable chuck body, locating lands provided thereon and adapted to register with said pre-machined surfaces on the work-piece, an eccentric shaft, clamping arms swingingly mounted thereon, toggle arms pivotally connected to the chuck body and to said clamping arms, at a point spaced outwardly from pivotal point of mounting and interconnected pressure actuater means for actuating said toggle arms and clamping arms to rigidly secure the work-piece in position.

8. The combination set forth in claim 7 in which interconnected means includes cylinders having pistons reciprocatingly mounted therein, a piston rod on each piston and having a rack section on the free end thereof, and toothed members on said eccentric and toggle arm shaft and adapted to be actuated by said racks when a pressure medium is supplied to said cylinders.

9. In a chucking mechanism for gripping and holding a work-piece having pre-machined locating surfaces thereon, a rotatable chuck body, locating lands provided thereon and adapted to align with the pre-machined surfaces on the work-piece, an eccentric shaft, clamping arms swingingly mounted thereon, toggle arms pivotally connected to said body and to the upper free ends of the clamping arms, a pressure actuated mechanism for swinging the upper free ends of said toggle arms, and pressure actuated mechanism communicating with the first-mentioned pressure actuated mechanism and synchronized therewith for rotating said eccentric shaft to lock the clamping arms in position.

10. The combination defined in claim 9 in which a spring retracted valve structure is mounted in said body, ports opening thereinto, and means engageable by the toggle arm actuating means for actuating said valve to control said ports.

RICHARD E. SCHULZ.

REFERENCES CITED

The following references are of record in the file of this patent:

UNITED STATES PATENTS

| Number | Name | Date |
| --- | --- | --- |
| 2,067,107 | Tomkins | Jan. 5, 1937 |
| 2,236,057 | Groene | Mar. 25, 1941 |
| 2,384,391 | Ott | Sept. 4, 1945 |